Sept. 5, 1939.　　　B. V. BARÉNYI　　　2,171,904
CHASSIS FOR MOTOR CARS
Filed Nov. 18, 1936　　　2 Sheets-Sheet 1
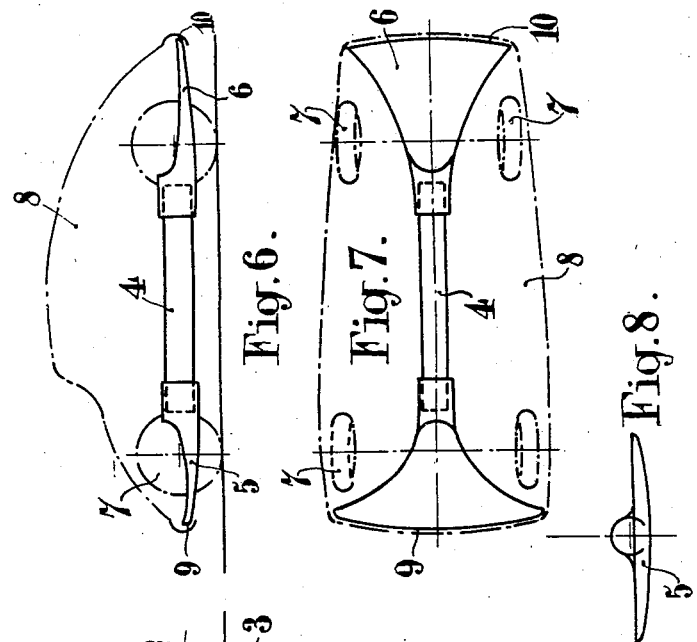
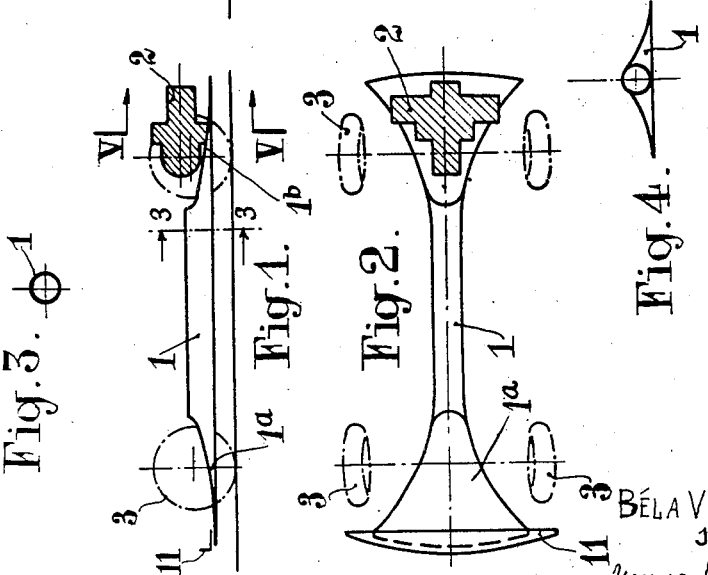
Inventor
BÉLA VIKTOR BARÉNYI
By
Young, Emery & Thompson
Attorneys

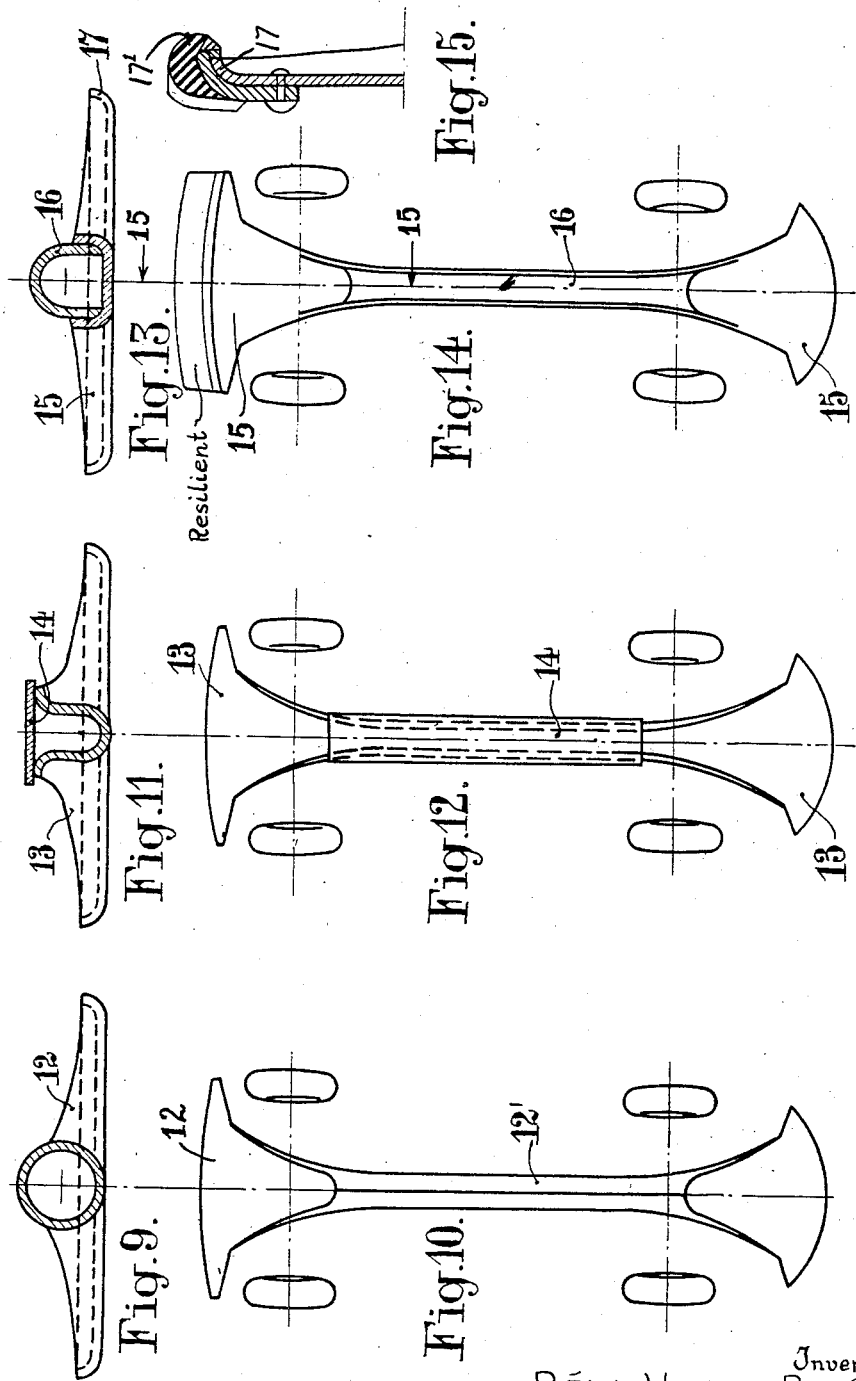

Patented Sept. 5, 1939

2,171,904

UNITED STATES PATENT OFFICE 2,171,904

CHASSIS FOR MOTOR CARS

Béla Viktor Barényi, Paris, France, assignor of one-half to Société de Progrès Technique, a corporation of France Application November 18, 1936, Serial No. 111,531
In Austria November 25, 1935

6 Claims. (Cl. 280—106)

This invention relates to a motor car frame in which the conventional frame is replaced by a central tubular back-bone chassis which is located in the axis of the car.

The object of the said invention is to provide such a tubular back-bone chassis of a simpler design than those presently known which have a pit for receiving the engine or which are subdivided in two arms near the axles. The construction according to the present invention provides the tubular back-bone chassis with a very great freedom as to shape and size of the engine, thus rendering its assembling easier and offering advantages for fitting the bumpers and mounting the body.

According to the present invention, the tubular back-bone chassis is provided with enlargements of shovel-like shape at both its ends, thus allowing the mounting of the axles of the independently sprung wheels, the springs and the engine. The latter may, consequently, be very easily assembled or disassembled and even replaced by an engine of different size due to the design of the tubular back-bone chassis.

The shovel-shaped parts in front and at the rear may be widened to such an extent that their edges form the bumpers either directly or indirectly this resulting in an efficient protection of the fragile parts of the engine against shocks. When the shovel-shaped parts in front and at the rear reach a width which is approximately that of the body, the latter can be very easily fixed and thus a good joint between chassis and body is obtained.

Finally the invention also relates to various shapes of tubular back-bone chassis, especially in connection with their manufacture.

The invention is shown in various examples in the appended drawings, in which:

Figure 1 is a side view of a chassis according to the present invention.

Fig. 2 is a plan view of the same.

Fig. 3 is a cross-section on line 3—3 of Fig. 1.

Fig. 4 is a front view of Fig. 2.

Fig. 5 is a part sectional view of Fig. 1 on line 5—5.

Fig. 6 is a side view of a modified form of chassis according to the present invention.

Fig. 7 is a plan view of the structure shown in Fig. 6.

Fig. 8 is a front view of the structure shown in Fig. 6.

Figs. 9, 11 and 13 are transverse sectional views of various types of the chassis.

Figs. 10, 12 and 14 are plan views of the same on a smaller scale.

Fig. 15 is a sectional view of Fig. 14 on line 15—15.

The one piece tubular back-bone chassis (Figs. 1 to 5) through which the axles are connected has a shovel-like form in those parts 1a and 1b intended to receive the engine and the springs. These parts project from the central section 1 of the tubular back-bone chassis, which is of tubular form. They are continuously flared towards their ends and in such a proportion as to make a platform which is large enough for the engine 2. On the sides this engine is substantially unobstructed (Fig. 5) and when taken off it is not necessary, contrary to what happens with known constructions, to lift it up from a narrow pit, but it is simply sufficient to draw it out horizontally. The wheels 3 are shown in dotted lines.

It is obvious that in providing a suitable form of the shovel-shaped parts, the platform for the engine can be independent of the construction of the tubular back-bone chassis within predetermined limits. In the case of shock, the engine is efficiently protected by the edges of the shovel-shaped part, these edges forming a projection and serving as bumpers; or if desired, the frontal edge of said part can be used for mounting special bumpers 17I (see Figs. 14 and 15).

According to Figs. 6 to 8 the central part of the tubular back-bone chassis has the form of a pipe 4, the shovels 5 and 6 forming sockets at one end; in these sockets are located the ends of the central part of the tubular back-bone chassis 4 and the shovels are fastened in a suitable manner. At their outer ends, the shovels have the same width as the body, the outline of which is shown in dotted lines 8. The frontal edges 9 and 10 of the shovels are fashioned according to the shape of the body. Thanks to this arrangement, the body is on the one hand protected against shocks by the frontal edges of the shovel; on the other hand it can be fastened in a very simple manner and it fits well on the shovels. With a view to strengthening these shovels, they can be folded up in the neighbourhood of the edges, making for instance a raised edging 17 (Fig. 15) or a border.

The design of the tubular back-bone chassis consisting of one piece can be made in various ways. For instance, a piece of sheet iron specially cut or stamped out for the purpose can be used, the ends forming the shovels 12 and the central part of it 12' being rolled up to form a pipe as shown in Figs. 9 and 10. The form according to Figs. 11 and 12 is distinguished from the former by the central part of the beam 13 which presents an U shaped cross-section. Such a tubular back-bone chassis can be made as a stamping in a press or of iron wrought to shape, with a very simple equipment.

With a view to strengthening the U shaped part one can provide its fastening by means of a plate of sheet-iron 14 as shown in Fig. 12. In a variation of this form according to Figs. 13 and 14 the central part has a flat U shaped cross-section in which is put and fitted the strengthening plate 16, which has also an U shaped cross-section. Thus, the central part presents a cross-section which is closed but of singular strength.

In constructions according to the present invention, there have been taken into account the requirements as to a greater resistance to folding of the ends of the chassis, as well as the resistance to torsion of the weakest points (middle of the car). Moreover, these constructions offer various other advantages already stated above and allow a saving in weight on the known constructions.

I claim:

1. In a motor car, an axial back-bone chassis consisting of a sheet-metal stamping with a central tubular part of annular cross-section merging at the ends into platforms of shovel-like shape.

2. In a motor car, an axial back-bone chassis comprising a sheet-metal stamping consisting of a U-shaped central part enlarged at the ends into platforms of shovel-like shape, and a central sheet-metal stamping fitted in the U-shaped part forming a central part of closed section therewith.

3. In a motor car, an axial back-bone chassis comprising a sheet-metal stamping consisting of a U-shaped central part enlarged at the ends into platforms of shovel-like shape, and a flat central plate strengthening the U-shaped part and forming a central part of closed section therewith.

4. In a motor car, an axial back-bone chassis consisting of a sheet-metal stamping with a closed section in the central part and enlarged at the ends into platforms of shovel-like shape having raised edgings.

5. In a motor car, an axial back-bone chassis consisting of a sheet-metal stamping with a closed section in the central part and enlarged at the ends into platforms of shovel-like shape diverging the width of the body of the car.

6. In a motor car, an axial back-bone chassis consisting of a sheet-metal stamping with a closed section in the central part and enlarged at the ends into platforms of shovel-like shape, the edges of which form the bumpers of the car.

BÉLA VIKTOR BARÉNYI.